United States Patent [19]

Schutt et al.

[11] Patent Number: 4,518,722

[45] Date of Patent: May 21, 1985

[54] DIFFUSELY REFLECTING PAINTS INCLUDING POLYTETRAFLUOROETHYLENE AND METHOD OF MANUFACTURE

[75] Inventors: John B. Schutt, Silver Spring; Michael C. Shai, Gambrills, both of Md.

[73] Assignee: The United States of America as represented by the Administrator of the National Aeronautics and Space Administration, Washington, D.C.

[21] Appl. No.: 604,337

[22] Filed: Apr. 26, 1984

[51] Int. Cl.$^3$ .............................................. C08L 27/18
[52] U.S. Cl. ................................. 523/135; 524/388; 524/567
[58] Field of Search ................. 523/135; 524/567, 388

[56] References Cited

U.S. PATENT DOCUMENTS 3,764,364 10/1973 Seiver .................................. 427/163
3,956,201 5/1976 Seiver .................................. 427/163

OTHER PUBLICATIONS

"Formulation Procedure And Spectral Data For A Highly Reflecting Coating From 200 nm To 2300 nm", Shai et al., (NASA) Goddard Space Flight Center Document No. X-762-71-266, July 1971.
"Reflectivity OF TFE-A Washable Surface-Compared With That Of BaSO$_4$", Schutt et al., Applied Optics, vol. 20, No. 12, Jun. 15, 1981.

*Primary Examiner*—Paul R. Michl
*Assistant Examiner*—N. Sarofin
*Attorney, Agent, or Firm*—John O. Tresansky; John R. Manning; Ronald F. Sandler

[57] ABSTRACT

A highly diffuse, reflective paint comprising an alcohol soluble binder, polytetrafluoroethylene (TFE) and an alcohol for coating a substrate and forming an optical reference with a superior Lambertian characteristic. A method for making the paint by first mixing the binder and alcohol, and thereafter by mixing in outgassed TFE. A wetting agent may be employed to aid the mixing process.

18 Claims, No Drawings

DIFFUSELY REFLECTING PAINTS INCLUDING POLYTETRAFLUOROETHYLENE AND METHOD OF MANUFACTURE

ORIGIN OF THE INVENTION

The invention described herein was made by employees of the United States Government, and may be manufactured and used by or for the Government for governmental purposes without the payment of any royalties thereon or therefor.

TECHNICAL FIELD

This invention pertains to organic pigment containing coatings and, more particularly, to diffuse reflecting paints with polytetrafluoroethylene pigment and the method of their manufacture.

BACKGROUND ART

Numerous white diffusely reflecting materials and coatings have been developed for use in radiometric calibration procedures and in bidirectional reflectance measurements, such as those employed as part of various remote sensing studies. These materials and coatings have included magnesium oxide, magnesium carbonate, barium sulfate, sodium chloride, sulfur and aluminum oxide. Coatings including homopolymers and copolymers with a substantial degree of fluorine substitution have also been used for this purpose because of the highly reflective properties of the polymers. Magnesium oxide, when freshly smoked, exhibits excellent average diffuse reflectance and magnitude of reflectance but it suffers from atmospheric instability and fragility.

In one instance, polytetrafluoroethylene (TFE), functioning as a pigment, was dispersed in a methyl acetate concentrate of a vinyl acetate-alcohol copolymer binder which was diluted for heavy loading of TFE by use of ethyl alcohol. The ethyl alcohol served as a low residue vehicle. This binder for the TFE proved to be generally too soft and also to be an inferior adhesive. Moreover, after application, the binder softened whenever the coating was subjected to water and did not re-harden until it re-dried.

Of all these diffusely reflecting materials and coatings barium sulfate has achieved the broadest scientific and commercial acceptance. The coating is prepared by having the barium sulfate, the pigment, weakly tethered with a water-soluble form of a polyvinyl alcohol (PVA), the binder, and water. The resulting mixture, however, is subject to phase agglomeration, i.e., because of interactions between the pigment and binder, the barium sulphate and PVA tend to settle to the bottom of the storage container with time and the container must be shaken severely to achieve a reasonable mix of the constituents. Also, the applied coating, while it is highly reflective and exhibits a Lambertian reflection characteristic, is very soft, water soluble and unwashable. Therefore, upon soiling, its optical properties cannot be restored. Further, it gradually changes its optical properties in sunlight. In a later development, ethyl alcohol was added to the barium sulphate-PVA-water mixture to substantially alleviate the phase agglomeration problem. The problems relating to its change in optical properties in sunlight, coating softness, water solubility and non-washability, however, remain.

STATEMENT OF THE INVENTION

Accordingly, it is an object of this invention to provide a paint which is highly and diffusely reflective.

It is another object of the invention to provide a diffusely reflecting paint which is highly reflective from the ultra-violet portion to the near infra-red portion of the radiation spectrum.

It is yet another object of the invention to provide a diffusely reflecting paint which is long lasting when subjected to typical operational environments.

It is still another object of the invention to provide a diffusely reflecting paint which is water insoluble after application and drying.

It is a further object of the invention to provide a diffusely reflecting paint which is washable.

It is a still further object of the invention to provide a diffusely reflecting paint which exhibits a superior Lambertian reflection characteristic.

It is a yet further object of the invention to provide a diffusely reflecting paint which is substantially free of phase agglomeration during storage.

It is a further object of the invention to provide a diffusely reflecting paint which is both light and heat stable.

It is a still further object of the invention to provide a TFE pigmented diffusely reflecting paint as well as the process of making such paint.

Briefly, these and other objects are achieved in a paint mixture including an alcohol soluble binder, alcohol, tetrafluroethylene (TFE), and, optionally, a wetting agent, whereby a paint capable of forming a diffusely reflecting coating is provided.

DETAILED DESCRIPTION OF THE INVENTION

The present invention employs well known and generally available components to form a paint mixture that is capable of forming a coating which is useful for radiometric calibration, reflection measurements, and generally for applications where a high reflectivity characteristic is desirable. Basically, the paint is formed by mixing an alcohol soluble binder, an alcohol, TFE and a wetting agent. Any alcohol soluble binder can be employed, but the silicone-based binders appear to be best. Any alcohol will apparently work as long as it is liquid. All of the aliphatic alcohols will work as long as their molecular weight is sufficiently low so that the alcohol is liquid at the mixing temperature. The TFE pigment may be varied in granule size, the larger sizes resulting in a final coating which is more coarse. Any non-ionic wetting agent will reduce surface tension so that the TFE can be easily added to the binder-alcohol mixture and, further, will allow the TFE to be coated with the alcohol after being added to the mixture. Thereafter, the wetting agent inhibits the aggregation of the TFE in the resulting mixture. It should be understood that, while the wetting agent is helpful in these several ways, it is not a necessary constituent.

The method of preparing the paint from the above-identified components is advantageous in terms of its simplicity because the mixing order and techniques are not critical. The preferred method is to first mix all the components except the TFE. Thereafter, the TFE is outgassed and then added to the other already mixed components. The outgassing presumably removes mostly water and has been found to prevent clumping of the TFE and eases its dispersion throughout the mixture. After mixing the required components, additional alcohol may be added to thin the paint for ease of application.

While the invention, as described above, is considered to be very broad in terms of the choice of the constituents which may be used, certain components have been identified as particularly appropriate for use in the paint mixture. Silicone-based, alcohol soluble binders have proved very useful. One example of such binders is an oligomer of methyl silanol manufactured by the Owens-Illinois Corporation (OI) as OI-650. The OI-650 is a homopolymer of methyltrisilanol with a molecular weight of about 7000. Another example is a silicone tethered ethyl silicate colloidal silica binder manufactured by the Dow Corning Corporation as Q9-6313. The Q9-6313 is an acidic solution of methyltrisilanol to which a sodium hydroxide stabilized colloidal silica sol has been added, diluted to 22% solids using isopropanol and stabilized to a ph of about between 3.5 to 5. Both binders should be refrigerated to extend their shelf life unless they are acid stabilized, otherwise the binders will thicken. Refrigeration of the Q9-6313 binder is somewhat less critical because it displays acidic reactions in the presence of trace amounts of water. The OI-650 binder may be purchased in flake form or furnished pre-mixed with butanol and ethanol at a 48% solids level. In the case of the Dow Corning Q9-6313 binder, Dow's commercial sales are limited to liquid form only where the binder is pre-mixed with iso-propanol and methanol. The preferred alcohols in the mixture are butanol, methanol, ethanol and iso-propanol while the TFE typically employed has been purchased from the Allied Chemical Corporation with a grade designation of G-80. An excellent wetting agent for this paint formulation is manufactured by American Cyanamid and designated as Aerosol-OT. The Aerosol-OT wetting agent includes a solvent which is 75% water and 25% ethanol. The active ingredient is dioctyl sodium sulfosuccinate.

Typical paint mixtures, made according to the invention from easily acquired constituent materials, will have approximate constituent percentage ranges by weight, as follows:

| | |
|---|---|
| OI-650 (pre-mixed with alcohol, in liquid form) | 15.8–40.2 |
| TFE | 19.9–28.4 |
| Ethanol | 30.8–41.4 |
| Butanol | 9.1–14.3 |
| Wetting Agent | 0.02–0.04 |
| Q9-6313 (pre-mixed with alcohol, in liquid form) | 15.3–43.8 |
| TFE | 19.5–25.9 |
| Iso-Propanol | 27.3–43.8 |
| Butanol | 9.4–15.0 |
| Wetting Agent | 0.02–0.04 |

Representative formulations, within the above-noted constituent ranges, which have proved to be exemplary, are as follows:

| | |
|---|---|
| OI-650 (liquid) | 111 gms |
| TFE (G-80) | 182 gms |
| Ethanol | 273 gms |
| Butanol | 91 gms |
| Aerosol-OT | 4 drops |
| Q9-6313 | 56 gms |
| TFE (G-80) | 91 gms |
| Iso-Propanol | 150 gms |
| Butanol | 50 gms |
| Aerosol-OT | 4 drops |
| OI-650 | 56 gms |
| TFE (G-80) | 91 gms |
| Iso-Propanol | 150 gms |
| Butanol | 50 gms |
| Aerosol-OT | 4 drops |

With respect to all these formulations, the preparation process employed was the same. Before mixing the constituents the TFE is outgassed in a vacuum by means of a mechanical vacuum pump. Depending upon the size of the pump, its operating condition and size of the TFE sample, the time required will vary. For the examples given above, a four hour outgassing cycle proved sufficient. All the constituents except the TFE and the Aerosol-OT are weighed out and mixed. For these small quantities, a kitchen type blender, operating at low speed, was satisfactory. To this combination, 4 drops of the Aerosol-OT wetting agent is added and thoroughly dispersed. Thereafter, the rate of agitation was increased, i.e., the blender speed was increased, and the measured amount of outgassed TFE was added. If the TFE is properly prepared prior to its addition, the total time required to perfect the dispersion of the TFE into the solvent-binder mixture is less than ten minutes.

The shelf life of the resulting formulations is at least four weeks if they are refrigerated. The recommended refrigeration is to prevent the binder from reacting with itself. Again, because the Q9-6313 binder is acid stabilized, refrigeration is less critical when it is used. There is generally no reaction between the constituents in the mixture. Upon sitting, the TFE may have a tendency to settle but, in such an event, the TFE may be resuspended by shaking it by hand or otherwise. Upon canning, blowing nitrogen over the paint employing the Q9-6313 binder has been found to be beneficial to keep atmospheric moisture from gelling the paint because the Q9-6313 has a tendency to gel when subjected to moisture. For the paint employing the OI-650 binder, addition of acetic acid is beneficial to extend pot life.

There are many suitable substrates which can be employed with these paints. Included are many types of metals, woods, plastics and ceramics, e.g., steels and cements. Aluminum is a preferred metal. In any event, to properly prepare the substrate surface for the application of a coating, the surface should be degreased. Satisfactory degreasing can be accomplished by a vapor-solvent application or through the use of a strong detergent dissolved in hot water. After drying, the substrate should be roughened, either by sand blasting or abrading. Following these steps a primer should be applied to the substrate. The preferred primer material is N-(2-aminoethyl)-3-aminopropyltrimethoxy-silane, commonly available from the Dow Corning Corporation as Z-6020. The primer is prepared by adding one part of the Z-6020 to 99 parts of isopropanol or isopropyl alcohol by weight and it is normally applied by a pressure pot spray gun. After evaporation of the alcohol from the primer, the top coating can be applied by spraying, flow coating or brushing. A minimum dry thickness of about 30 mils is preferred and may be achieved by multiple applications. Air drying is sufficient in most instances, however, because both binders cure slowly under ambient conditions, baking the primer is recommended at temperatures of between 85° and 150° C.

After the primer is dry, the paint can be brushed or sprayed on to the substrate. Brushing is adequate where the purpose is generally to reflect heat or light, but spraying is required to achieve a good optical reference. Conventional paint spraying equipment can be used but an airless spray gun or pressure pot system are preferred. When using a pressure pot, a Binks Model 18 with a Number 78 fluid nozzle has been found satisfactory. The coatings may be applied in several applications until a dry thickness of at least 30 mils is obtained. The resultant coating is touch dry in about one hour after application but a full cure requires 3 to 4 weeks. The curing process can be accelerated by oven curing for about 2 hours at 85° C. or warmer. Curing is more rapid at increased temperatures. The cured paint is optically flat in appearance with a matte finish. The final coating is somewhat soft because the TFE is particulate and not fused with a film. For the OI-650/TFE paints the final coating is TFE bound in polymethytrisilanol. For the Q9-6313/TFE paints the final coating is TFE bound in a silicate-silicone. While the paint is soft, it can be repeatedly cleaned by washing, either by immersion in water or by the application of a water spray, and in most instances, the optical characteristics of the coating can be substantially retained after washing. Other then washability, these paints have many desirable characteristics. The dry coating is suitable as an optical diffuser reference coating whose Lambertian reflection or transmission characteristics will be largely governed by the coating thickness and the choice of the supporting substrate. Its Lambertian reflection characteristic is superior to that of the barium sulphate reflective coatings. Typically, the coating is about 90% in reflective efficiency in the ultra violet and near or middle infra-red ranges and about 95% in reflective efficiency in the visible range. Moreover, it has been found to be light-stable and heat-stable. While emphasis has been placed on the use of certain TFE coatings for use as calibrated reflectors, these coatings are appropriate paints for general exterior use, especially in localities where high reflectance is desired.

The principles and preferred embodiments of the present invention have been described. The invention which is intended to be protected is not to be construed as limited to the particular forms disclosed because these are to be regarded as illustrative rather than restrictive. Variations and changes may be made by those skilled in the art without departing from the spirit of the present invention.

We claim:

1. A diffuse, reflective paint composition comprising a self-polymerizing, alcohol soluble silicone-based paint binder, granule sized TFE pigment and a liquid alcohol.

2. A paint according to claim 1 which includes a wetting agent.

3. A paint according to claim 2 wherein said wetting agent is non-ionic.

4. A paint according to claim 1 wherein said alcohol soluble binder is a silicone-based binder which is an oligomer of methyl silanol.

5. A paint according to claim 1 wherein said alcohol soluble binder is a silicone-based binder which is a silicone silicate colloidal silica binder.

6. A paint according to claim 1 wherein said alcohol is an aliphatic alcohol.

7. A paint according to claim 6 wherein said alphatic alcohol has a relatively low molecular weight.

8. A paint according to claim 7 wherein said alcohol is selected from the group consisting of butanol, methanol, ethanol and iso-propanol.

9. A paint according to claim 4 wherein said binder is a homopolymer of methyltrisilanol with a molecular weight of about 7000.

10. A paint according to claim 5 wherein said binder is an acidic solution of methyltrisilanol to which a sodium hydroxide stabilized colloidal silica sol has been added, diluted to 22% solids using isopropanol and stabilized to a ph of about between 3.5 to 5.

11. A diffuse, reflective paint comprising percentage constituent ranges of about:

| | |
|---|---|
| [OI-650] An alcohol soluble silicone-based paint binder, pre-mixed with alcohol, in liquid form, characterized as a homopolymer of methyltrisilanol with a molecular weight of about 7000 | 15.8–40.2 |
| granular TFE | 19.9–28.4 |
| Ethanol | 30.8–41.4 |
| Butanol | 9.1–14.3. |

12. A diffuse, reflective paint comprising percentage constituent ranges of about:

| | |
|---|---|
| [Q9-6313] An alcohol soluble silicone-based paint binder, pre-mixed with alcohol, in liquid form, characterized as an acidic solution of methyltrisilanol to which a sodium hydroxide stabilized colloidal silica sol has been added diluted to 22% solids using isopropanol and stabilized to a ph of about between 3.5 to 5 | 15.3–43.8 |
| granular TFE | 19.5–25.9 |
| Iso-Propanol | 27.3–43.8 |
| Butanol | 9.4–15.0. |

13. A diffuse, reflective paint comprising the following relative unit formulation:

| | |
|---|---|
| [OI-650] An alcohol soluble silicone-based paint binder, pre-mixed with alcohol, in liquid form, characterized as a homopolymer of methyltrisilanol with a molecular weight of about 7000 | 111 gms |
| granular TFE | 182 gms |
| Ethanol | 273 gms |
| Butanol | 91 gms. |

14. A diffuse, reflective paint comprising the following relative unit formulation:

| | |
|---|---|
| [Q9-6313] An alcohol soluble silicone-based paint binder, pre-mixed with alcohol, in liquid form, characterized as an acidic solution of methyltrisilanol to which a sodium hydroxide stabilized colloidal silica sol has been added diluted to 22% solids using iso-propanol and stabilized to a ph of about between 3.5 to 5 | 56 gms |
| granular TFE | 91 gms |
| Iso-Propanol | 150 gms |
| Butanol | 50 gms. |

15. A diffuse, reflective paint comprising the following relative unit formulation:

| | |
|---|---|
| [OI-650] An alcohol soluble silicone-based paint binder, pre-mixed with alcohol, in liquid form, characterized as a homopolymer of methyltrisilanol | 56 gms |

| -continued | |
|---|---|
| with a molecular weight of about 7000 | |
| granular TFE | 91 gms |
| Ethanol | 150 gms |
| Butanol | 50 gms. |

16. The process of making a diffuse, reflective paint comprising:

providing selected amounts of a self-polymerizing silicone-based alcohol soluble binder, one or more liquid alcohols, and granular TFE;

mixing said binder and alcohol or alcohols, and outgassing said TFE;

mixing said outgassed TFE with said mixture.

17. The process of claim 16 wherein a wetting agent is provided and mixed with said binder and alcohol or alcohols.

18. The process of claim 17 wherein said wetting agent is non-ionic.

* * * * *